United States Patent
Yokoyama et al.

(10) Patent No.: US 7,552,978 B2
(45) Date of Patent: Jun. 30, 2009

(54) BRAKE DEVICE AND CONTROLLER FOR THE SAME

(75) Inventors: Atsushi Yokoyama, Tokyo (JP); Taisetsu Tanimichi, Mito (JP); Satoru Kuragaki, Isehara (JP); Yukihiro Osawa, Tokyo (JP); Jun Kubo, Hino (JP); Yukihiko Inoue, Ebina (JP); Katsuya Iwasaki, Isehara (JP); Mitsuo Sasaki, Hadano (JP); Tsutomu Hibi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/666,307

(22) PCT Filed: Oct. 29, 2004

(86) PCT No.: PCT/JP2004/016488

§ 371 (c)(1),
(2), (4) Date: Apr. 26, 2007

(87) PCT Pub. No.: WO2006/046318

PCT Pub. Date: May 4, 2006

(65) Prior Publication Data

US 2008/0116740 A1    May 22, 2008

(51) Int. Cl.
*B60T 7/00* (2006.01)
(52) U.S. Cl. .......................................... 303/3; 188/156
(58) Field of Classification Search .................. 303/3, 303/7, 15, 20, 152, 155, DIG. 11
See application file for complete search history.

(56) References Cited

U.S. PATENT DOCUMENTS

| | | | | |
|---|---|---|---|---|
| 4,203,629 | A | * | 5/1980 | Bodin ........................ 303/10 |
| 6,099,087 | A | * | 8/2000 | Mortimer et al. ......... 303/115.2 |
| 6,105,737 | A | * | 8/2000 | Weigert et al. .............. 188/158 |
| 6,837,552 | B2 | * | 1/2005 | Reuter et al. ........... 303/122.09 |
| 6,860,569 | B1 | * | 3/2005 | Campau et al. ................ 303/11 |
| 2002/0158510 | A1 | * | 10/2002 | Kobayashi et al. .......... 303/155 |

(Continued)

FOREIGN PATENT DOCUMENTS

JP    6-9964 B2    2/1994

(Continued)

OTHER PUBLICATIONS

International Search Report dated Dec. 14, 2004 (Two (2) Pages).

*Primary Examiner*—Christopher P Schwartz
(74) *Attorney, Agent, or Firm*—Crowell & Moring LLP (57) ABSTRACT

A brake system that provides a good pedal feel, that assists stepping force of a driver by a small motor, and that can control braking force of wheels individually. The brake system comprises a first actuator (5) for increasing a liquid pressure in a master cylinder (2) by driving torque of a motor (51), and a second actuator (6) capable of driving a brake generating mechanism (3) without transmitting power to the master cylinder (2), wherein the actuators (5, 6) to be driven are switched depending on the operation of a brake pedal (1). The first and second actuators (5, 6) are connected to hydraulic piping (4f, 4r), and a pressurized oil is supplied to the brake generating mechanism (3) through hydraulic valve means (63f, 63r, . . . 65rr).

10 Claims, 5 Drawing Sheets

U.S. PATENT DOCUMENTS

2004/0251095 A1* 12/2004 Simard et al. ............... 188/156
2004/0256911 A1* 12/2004 Hatano et al. ................ 303/3

FOREIGN PATENT DOCUMENTS

| | | |
|---|---|---|
| JP | 10-35438 A | 2/1998 |
| JP | 2002-67909 A | 3/2002 |
| JP | 2002-187537 A | 7/2002 |
| JP | 2002-27438 A | 9/2002 |
| JP | 2004-161074 A | 6/2004 |

* cited by examiner

BRAKE DEVICE AND CONTROLLER FOR THE SAME

TECHNICAL FIELD

The present invention relates to a brake system for an automobile, and in particular to an electronic control apparatus in a brake system for driving and controlling a brake force under electronic control.

BACKGROUND OF THE INVENTION

Background Art

In general, a brake system for a vehicle comprises a master cylinder for converting a pedaling force applied to a brake pedal by an operator into a hydraulic pressure of brake fluid, brake force generating mechanisms provided in the vehicle, and composed of friction discs and the like, a brake transmission mechanism for transmitting a hydraulic pressure from the master cylinder to the brake force generating mechanism, and a vacuum type boosting mechanism for pressurizing the brake fluid in the master cylinder in cooperation with the pedaling force of the operator, so as to assist the pedaling force of the operator. By the way, those using the vacuum type boosting mechanism utilize an engine vacuum as a pressure source, and accordingly, the vacuum type boosting mechanism should have a large diameter in order to obtain a large power. The brake system has caused various problems, that is, it does not only have to have a large size but also causes a difficulty in lay-out of pipe lines, and a risk of abrupt decrease in the brake force when the engine come to a stop.

Thus, as disclosed in JP-A-6-9964, there has been provided a brake system in which an electric brake boosting mechanism using an electric actuator is arranged, instead of a vacuum type boosting mechanism. The electric brake boosting mechanism is composed of an electric motor for producing a drive torque from an electric energy, and a ball-screw mechanism for converting the drive torque of the motor into a force in the axial direction of the master cylinder. When the brake pedal is depressed, an appropriate force is applied to the electric motor in accordance with a pedaling force detected by a pedaling force sensor, and is then converted into an axial force of a piston by means of the ball-screw mechanism so as to apply an assist force appropriate for the pedaling force transmitted from the brake pedal to the master cylinder.

JP-A-10-35438 discloses a brake system as another conventional example, which comprises an electric actuator and a vacuum type actuator, or comprises an electric actuator and a hydraulic actuator, as automatic brake actuators. Specifically, in this brake device, the electric actuator having an excellent controllability is used for weak braking, and the vacuum actuator or the hydraulic actuator which generates a high output power is used for strong brake so as to materialize both weak and strong brake characteristics.

DISCLOSURE OF THE INVENTION

In the conventional electric brake boosting mechanism, since an assist force which is substantially equal to that generated by the vacuum type brake boosting mechanism has been generated only by an electric actuator, there has been required an electric brake boosting mechanism having a drive capacity equal to that of the vacuum type brake boosting mechanism. In an operating device which is operated by a foot, such as a brake pedal, an operating force will be larger than that required by a device operated by an arm or a finger. Accordingly, there has been raised such a problem that the electric brake boosting mechanism becomes inevitably large-sized in order to materialize an electric brake boosting mechanism having a drive capacity substantially equal to that of the vacuum type brake boosting mechanism.

Also in the example disclosed in JP-A-10-35438, since a brake pedal is not mechanically isolated from a strong brake actuator, should a heavy brake actuator be driven in order to assist the operation by the driver, there would be caused such a problem that the pedaling feeling for the driver is deteriorated. Further, since both electric actuator and heavy brake actuator are coupled with the brake pedal, a plurality of brake forces cannot be controlled independently from each other even though two actuators are present.

An object of the present invention is to provide a brake system for assisting a pedal force by a driver with the use of a small-sized electric actuator, having satisfactory pedaling feeling, and as well to provide a control apparatus for a brake system.

Another object of the present invention is to provide a brake system which is capable of individually controlling brakes for a plurality of wheels, and a control apparatus for the brake system.

According to the present invention, there is provided a control apparatus for a brake system, having an actuator control unit for detecting a displacement of a brake pedal which is displaced in response to an operating force by a driver, for controlling an actuator, and the actuator controlled by the actuator control unit, for generating a brake force acting upon a brake force generating mechanism, wherein the actuator control unit is composed of an electric actuator controller and a hydraulic actuator controller, the above-mentioned actuator is composed of a first actuator and a second actuator incorporating a hydraulic pump and the hydraulic valve means which are controlled by the hydraulic actuator controller, the first actuator incorporating a hydraulic pressure supply means which is provided in a hydraulic pipe line connected to the brake force generating mechanism and a hydraulic valve means and which are operated by an electric drive source controlled by the electric actuator controller, the above-mentioned hydraulic pressure supply means is connected to the hydraulic pipe line in parallel with the above-mentioned hydraulic pump so that a hydraulic pressure is fed into the brake force generating mechanism by way of the hydraulic valve means, the hydraulic pump is connected to the hydraulic pipe line in parallel with the hydraulic pressure supply means, for feeding a hydraulic pressure into the brake force generating mechanism by way of the hydraulic valve means, and the hydraulic valve means is adapted to feed a hydraulic pressure into the brake force generating mechanism from either one of the hydraulic supply means and the hydraulic pump.

The above-mentioned valve means can be composed of at least two sets of hydraulic valves which are opened and closed under electronic control.

The above-mentioned electric actuator controller and the hydraulic actuator controller can be operated as being changed over in accordance with a degree of displacement of the brake pedal, or a time by which a changing value of the pedal exceeds a predetermined value.

There may be provided such a configuration that the first brake actuator drives the brake force generating mechanism for at least one of a plurality of wheels incorporated in a vehicle, and the second brake actuator can drive the brake force generating mechanism different from that of the first brake actuator.

There may be provided an electric accumulator for driving the first brake actuator, and an electric accumulator for driving the second brake actuator.

Further, according to the present invention, there is provided a control apparatus for a brake system having an actuator control unit detecting a displacement of a brake pedal which is displaced in accordance with an operating force by the operator, for controlling an actuator, and the actuator for generating an brake force acting upon a brake force generating mechanism, wherein the actuator control unit is composed of an electric actuator controller and a hydraulic actuator controller, the electric actuator controller generates an electric assist force signal in accordance with a change in displacement of the brake pedal, and calculates an integral value obtained by time integration when the electric assist force signal exceeds a first rated electric assist force signal value, the electric actuator controller setting the electric assist force signal to a first rated electric assist force signal value when the integral value exceeds a predetermined value, or setting at once the electric assist force signal value to the first rated electric assist force signal value when the electric assist signal has come to a second rated electric assist force signal value, and the hydraulic actuator controller generates a hydraulic assist force signal in accordance with a change of the brake pedal when the electric actuator controller generates the electric assist signal which is set to the first rated electric assist force signal value.

The above-mentioned actuator control unit can control in such a way that the control of the actuator by the electric actuator force signal is interrupted when the electric actuator control unit generates the first rated electric assist force signal, and the actuator is controlled by the hydraulic actuator signal generated from the hydraulic actuator controller.

An embodiment of the present invention is composed of a first brake actuator for increasing the hydraulic pressure of the master cylinder by a drive torque of an electric motor in order to assist the pedaling force by the driver, and a second brake actuator capable of driving the brake force generating mechanism without feeding power to the master cylinder. Thus, a pedaling force can be assisted by the electric actuator upon weak braking while the second brake actuator can apply a brake force to wheels without the hydraulic pressure in the master cylinder being changed, thereby it is possible to provide a brake system having satisfactory pedal feeling, capable of assisting a pedaling force of the driver by means of a small-sized electric actuator.

The second brake actuator comprises a hydraulic pump, and a passage for transmitting a hydraulic pressure pressurized by the hydraulic pump, into the brake force generating mechanism is connected to a passage which connects the master cylinder to the brake force generating mechanism so as to achieve the object of the present invention. Thus, no hydraulic pressure transmits through the passage from the hydraulic pump when the electric actuator is operated, but no variation in hydraulic pressure is caused when the hydraulic actuator is operated, thereby it is possible to constitute a brake system having satisfactory pedal feeling, capable of assisting a pedaling force of the driver by means of a small-sized electric actuator.

The second brake actuator comprises a hydraulic valve between the master cylinder and the hydraulic pump, and the hydraulic valve is shut off when the second brake actuator is operated, so as to achieve the object of the present invention. Thus, no variation in hydraulic pressure is caused when the hydraulic actuator is operated, and thereby it is possible to constitute a brake system having satisfactory pedal feeling, capable of assisting a pedaling force of the driver by means of a small-sized electric actuator.

The second brake actuator incorporates a bypass passage connecting between the brake pedal and the brake force generating mechanism so as detour the hydraulic pump, and a hydraulic pressure from the master cylinder which is pressurized by a pedaling force of the driver or the first brake actuator is transmitted to the brake force generating mechanism through the bypass passage when the second brake actuator is operated, so as to achieve the object of the present invention. Thus, no hydraulic pressure is transmitted through the passage for the hydraulic pump when the electric actuator is operated. Thereby, it is possible to constitute a brake system having satisfactory pedal feeling, capable of assisting the pedaling force of the driver by a small-sized electric actuator.

The drive of the above-mentioned second brake actuator is started in accordance with a degree of a signal from a pedal sensor for detecting a displacement or a pedaling force of the brake pedal or in accordance with a time when the signal value from the pedal sensor is not less than a predetermined value, so as achieve the object of the present invention. Thus, even though the small-sized electric actuator is used, the operation frequency of the hydraulic actuator can be limited, and a restoring force of a resilient member does not cause any burden upon the drive unit when the stiffness is adjusted at an initial position, thereby, it is possible to constitute a brake system having satisfactory pedal feeling, capable of assisting a pedaling force of the driver by means of a small-sized electric actuator.

The first brake actuator drives a brake force generating mechanism for at lease one of a plurality of wheels incorporated in the vehicle, and the second brake actuator drives a brake force generating mechanism different from that driven by the first brake actuator, so as to achieve the object of the present invention. Thus, the assist force which should be generated by the electric actuator can be reduced, thereby it is possible to constitute a brake system capable of assisting a pedaling force of the driver by means of a small-sized electric actuator.

The signal from the pedal sensor is inputted to the first control unit for controlling the drive of the first brake actuator, and to a second control unit for controlling the drive of the second brake actuator so as to achieve the object of the present invention. Thereby, it is possible to constitute a brake system having satisfactory pedal feeling, capable of assisting a pedaling force of the driver by means of a small-sized motor driven actuator.

A plurality of electric accumulators are provided for driving the first brake actuator and the second brake actuator so as to achieve the object of the present invention. Thereby, it is possible to constitute a reliable brake system having satisfactory pedal feeling, capable of assisting a pedaling force of the driver by means of a small-sized electric actuator.

In an embodiment of the present invention, there is provided a brake system incorporating a brake pedal which is displaced in accordance with an operating force of the driver, an actuator control unit detecting a displacement of the brake pedal, for controlling an actuator, and the actuator by the actuator control unit, for generating a brake force acting upon a brake force generating mechanism, wherein the actuator control unit is composed of the electric actuator controller and a hydraulic actuator controller, the actuator is composed of a first actuator and a second actuator incorporating a hydraulic pump controlled by the hydraulic actuator controller, and the hydraulic valve means, the first actuator is arranged in a hydraulic pipe line connected to the brake force generating mechanism and incorporating a hydraulic pressure supply means operated by an electric drive source controlled by the electric actuator controller, and a hydraulic valve means, the hydraulic pressure supply means is connected to the hydraulic pipe line in parallel with the hydraulic pump so that a hydraulic pressure is fed into the brake force generating mechanism through the hydraulic valve means, and the hydraulic pump is connected to the hydraulic pipe line in parallel with the hydraulic pressure supply mans so that a hydraulic pressure is fed to the brake force generating mechanism through the hydraulic valve means, the hydraulic valve means is operated so as to feed the hydraulic pressure from either the hydraulic pressure supply means or the hydraulic pump, the electric actuator controller delivers an electric assist force signal in accordance with a change of the brake pedal, and carries out time integration when the electric assist force signal exceeds a first rated electric assist signal value so as to obtain an integral value, in order to set the electric assist signal value to the first rated electric assist force signal value if the integral value exceeds a predetermined value, or set at once the electric assist force signal value to the first rated electric assist force signal value when the electric assist force signal reaches a second rated electric signal value, the hydraulic actuator controller delivers a hydraulic assist signal in accordance with a change of the brake pedal when the electric actuator controller delivers an electric assist force signal which is set to the first rated electric assist force signal value, and the actuator control unit interrupts the control of the first actuator depending upon the electric actuator force signal, and controls the second actuator in accordance with a hydraulic actuator signal delivered from the hydraulic actuator controller.

As stated above, according to the present invention, there are provided the electric actuator for increasing the hydraulic pressure of the master cylinder by means of the drive torque of the electric motor, and the second actuator which can drive the brake force generating mechanism without transmitting a power to the master cylinder in order to change over the actuators to be driven in accordance with an operating condition of the brake pedal. Thereby it is possible to provide a brake system having satisfactory pedal feeling, capable of assisting a pedaling force of the driver by a small-sized electric motor and of individually controlling braking forces for a plurality of wheels, and the control apparatus therefor.

BEST MODE FOR IMPLEMENTING THE INVENTION

Embodiments

Figure 1:
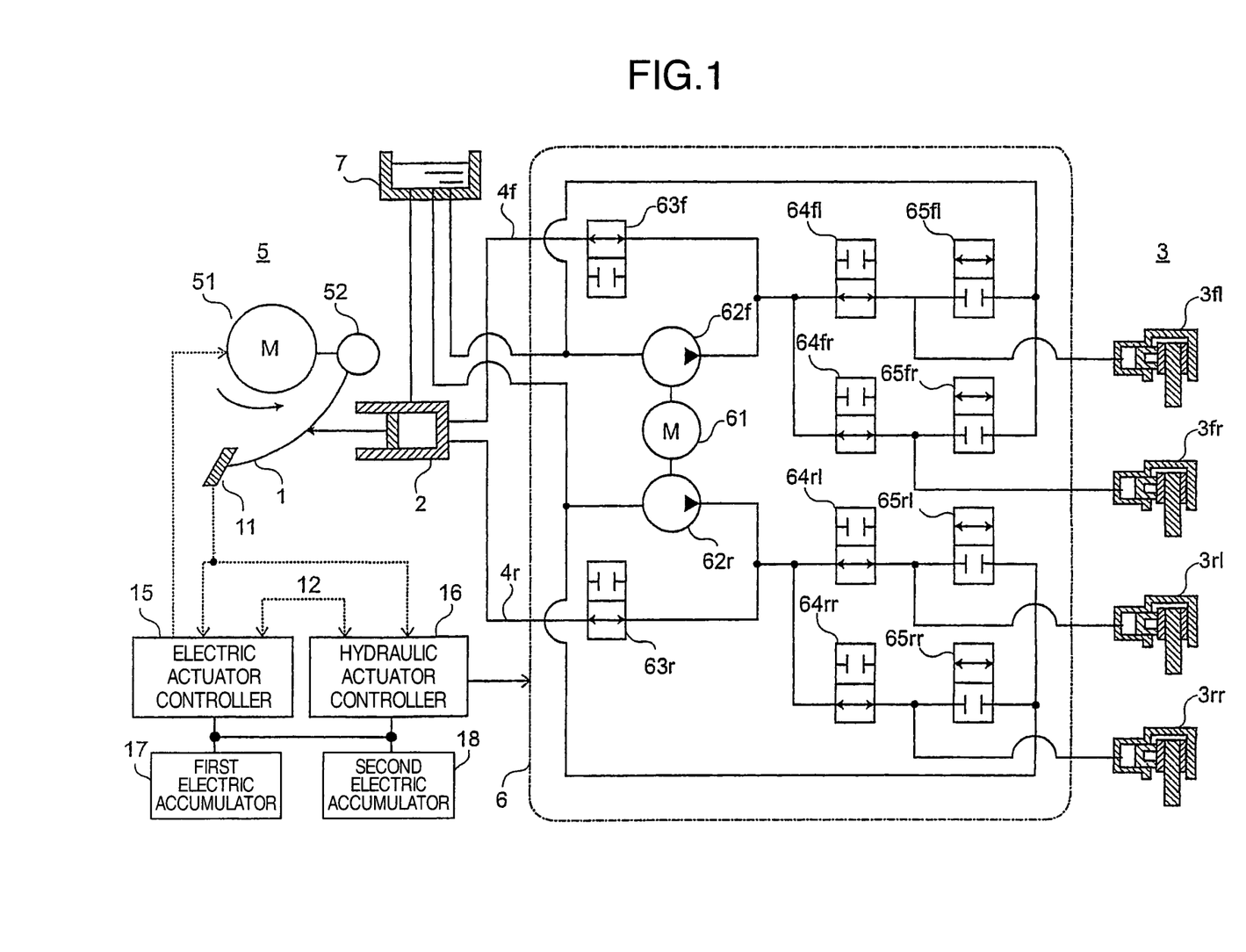
FIG. 1 is a view illustrating an embodiment of the present invention.

FIG. 1 shows a first embodiment of the present invention. In the foregoing description, it is noted that suffixes f and r of reference numerals will indicate front wheels and rear wheels, respectively, and suffixes fl and fr indicate front left and front right wheels, respectively while suffixes rl and rr indicate rear left and rear right wheels, respectively. Reference numerals without suffix will indicate all of the wheels.

A brake system is composed of a brake pedal 1 which is applied thereto with a pedaling force applied when the driver desires deceleration of a vehicle, and which is displaced in response to the pedaling force, a master cylinder 2 for converting a pedaling force at the brake pedal 1 into a pressure of brake fluid, brake force generating mechanisms (devices) 3fl-3rr for converting a hydraulic pressure from the master cylinder 2 into brake forces for four wheels, hydraulic pipe lines 4f, 4r connecting the master cylinder 2 to the brake force generating mechanisms 3, an electric actuator 5 fitted to the rotary shaft of the brake pedal 1, for applying a torque to the brake pedal 1 so as to boost up the hydraulic pressure of the master cylinder 2, a hydraulic actuator 6 connected in the hydraulic pipe lines 4f, 4r, for controlling the hydraulic pressure so as to increase and decrease the hydraulic pressure by means of hydraulic pumps and hydraulic valves, and a reservoir 7 for supplying the brake fluid into the master cylinder 2 and the hydraulic pumps. In this embodiment, the actuator is composed of an electric actuator 5 as a first actuator, and the hydraulic actuator as a second actuator, a part of their components is commonly used. In another configuration, their components may be arranged independent from each other. The actuator drives and controls the brake force generating mechanisms 3.

The brake pedal 1 is mounted thereon with a pedaling force sensor 11 as a pedal sensor for detecting a pedaling force of the brake pedal 1.

The electric actuator 5 is composed of an electric motor 51 for producing a drive torque by means of an electric energy, and a speed reduction gear unit 52 for amplifying the drive torque of the electric motor 51. The electric actuator 5 is connected thereto with an electric actuator controller 15 for controlling the drive torque of the electric actuator 5 in accordance with data such as an operating condition of the brake pedal detected by the pedaling force sensor 11, a brake pedal displacement sensor which is not shown, and the like, a drive condition of the hydraulic actuator 6, a drive condition of the vehicle, an external environment of the vehicle and the like. Further, a part of the hydraulic actuator 6 which will be explained as follows is commonly used.

The hydraulic actuator 6 is composed of a hydraulic pump motor 61 for producing a drive torque by means of an electric energy, hydraulic pumps 62f, 62r for converting the drive torque of the hydraulic pump motor 61 into hydraulic braking pressures, hydraulic valves 63f, 63r for opening and closing passages from the master cylinder 2 to the hydraulic actuator 6 under electronic control, and hydraulic valves 64fl-64rr for opening and closing passages from the master cylinder 2 or the hydraulic pumps 62 to the brake force generating mechanisms 3fl-3rr under electronic control, and hydraulic valves 65fl-65rr for opening and closing passages from the brake force generating mechanisms 3fl-3rr to the reservoir 7 under electronic control in order to reduce the hydraulic pressures in the brake force generating mechanism 3fl-3rr. The hydraulic actuator 6 is connected thereto with a hydraulic actuator controller 13 for controlling the hydraulic actuator 6 in accordance with data such as an operating condition of the brake pedal detected by the pedaling force sensor 11, the brake pedal displacement sensor which is not shown, or the like, and a drive condition of the electric actuator 5, and an external environment of the vehicle.

Further, the electric actuator controller 15 and the hydraulic actuator controller 16 are connected to a first electric accumulator 17 and a second electric accumulator 18 which may be constituted by batteries or capacitors (which are not shown), for feeding electric powers to the controllers. Further, the electric actuator controller 15 and the hydraulic actuator controller 16 are connected to each other by a signal line 12 so as to mutually grasp their control conditions. In the case of deenergization of the hydraulic actuator controller 16, the hydraulic valves 63 and the hydraulic valves 64 are held to be opened while the hydraulic valves 65 are held to be closed under spring forces.

Since the electric actuator 5 can be finely controlled by the drive torque of the electric motor 51 so as to smoothly control an assist force, thereby it is possible to offers such an advantage that its durability is excellent, but it also offers such an disadvantage that sufficient force is not conveniently held in a stead-state manner if the electric actuator 5 is small-sized. Meanwhile, the hydraulic actuator 6 accumulates a hydraulic pressure by means of the hydraulic pump motor 61 and controls the hydraulic pressure through the control of opening and closing of the hydraulic valves 64, 65 so as to produce a large brake force, but vibrations of the hydraulic pump motor 61 and the hydraulic valves 64, 65 are large so as to deteriorate the pedal feeling if the vibrations are transmitted to the brake pedal 1. Further, Due to a mechanical consumption caused by opening and closing of the hydraulic valves or the like, there has been such a task that the operating frequency thereof should be reduced.

In view of the above-mentioned configuration, there are incorporated the first actuator (the electric actuator 5) for increasing the hydraulic pressure of the master cylinder by means of the drive torque of the electric motor so as to assist a pedaling force by the driver, and the second actuator (the hydraulic actuator 6) capable of driving the brake force generating mechanisms without using the master cylinder. Thus, the pedaling force can be assisted by the electric actuator upon weak braking, and the pedaling force can be assisted by the hydraulic actuator upon strong braking without changing the hydraulic pressure of the master cylinder, thereby it is possible to provide a brake system having satisfactory feeling and which can assist a pedaling force of the driver by means of a small-sized electric actuator.

Further, the hydraulic actuator 6 incorporates the hydraulic pumps 62, and the passages for transmitting hydraulic pressures produced by the hydraulic pumps to the brake force generating mechanism are connected to the passages connecting the master cylinder with the brake force generating mechanisms. Accordingly, when the electric actuator 5 is operated, no hydraulic pressure is transmitted through the passages for the hydraulic pumps 62 while when the hydraulic actuator 6 is operated, the hydraulic pressure of the master cylinder 2 is not changed, thereby it is possible to provide a brake system having satisfactory pedal feeling, capable of assisting the pedaling force of the driver by a small-sized electric actuator.

Further, the hydraulic actuator 6 incorporates the hydraulic valves 63 between the master cylinder 2 and the hydraulic pumps 62, and when the hydraulic actuator 6 is energized, the hydraulic valves 63 can be shut off. Thus, the hydraulic pressure of the master cylinder 2 is never changed when the hydraulic actuator 6 is operated, and accordingly, it is possible to provide a brake device having satisfactory pedal feeling, capable of assisting a pedaling force of the driver by a small-sized electric actuator.

Further, the hydraulic actuator 6 incorporates hydraulic pipe lines which connects the brake pedal 1 with the brake force generating mechanisms 3 without passing through the hydraulic pump 62, and accordingly, upon deenergization of the hydraulic actuator 6, the hydraulic pressure of the master cylinder pressurized by a pedaling force of the driver or the electric actuator 5 is transmitted to the brake force generating mechanisms 3 by way of these hydraulic pipe lines. Thus, upon energization of the electric actuator, no hydraulic pressure is transmitted through the passages for the hydraulic pumps 62, thereby it is possible to provide a brake system having satisfactory pedal feeling, capable of assisting the pedaling force of the driver by means of a small-sized electric actuator.

Explanation will be hereinbelow made of the operation of the brake system having the above-mentioned configuration.

When the brake pedal 1 is displaced by a pedaling force (operating force) by the driver, the pedaling force sensor 11 delivers a signal corresponding to the pedaling force, to the electric actuator controller 15. The electric actuator controller 15 calculates an electric assist force F which should be generated by the electric actuator 5, from the signal delivered from the pedaling force sensor 11, and delivers a current corresponding to the electric assist force F to the electric motor 51. The drive torque of the electric motor 51 is amplified by the speed reduction gear unit 52 and is then applied to the rotary shaft of the brake pedal 1. The pedaling force by the driver and the drive torque of the electric actuator 5 are transmitted to the master cylinder 2 so as to be converted into a hydraulic pressure of brake fluid. The hydraulic pressure of the master cylinder 2 is transmitted to the brake force generating mechanisms 3 via the hydraulic pipings so as to act as the brake forces for the wheels of the vehicle.

Figure 2:
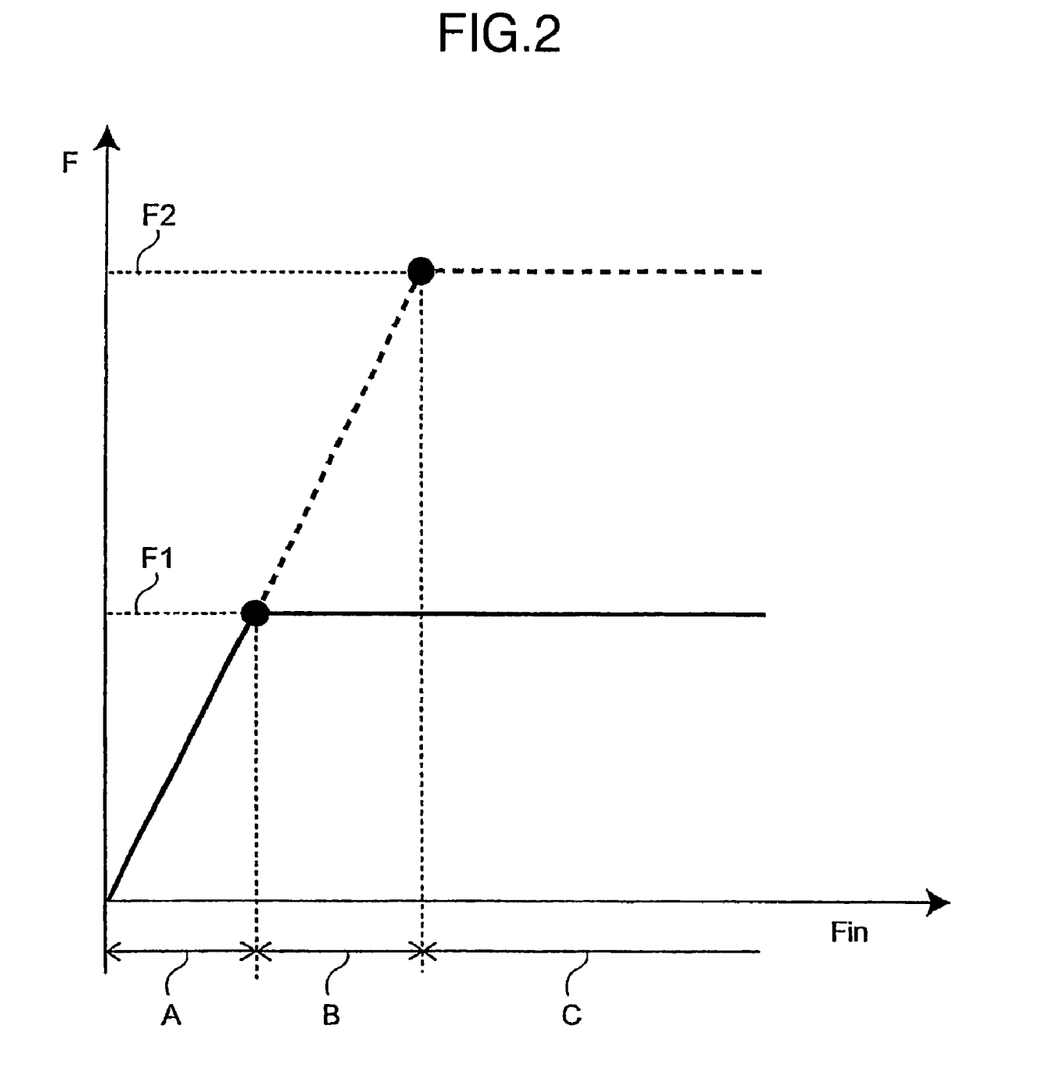
FIG. 2 is a view which shows operating conditions of the embodiment of the present invention.
Figure 3:
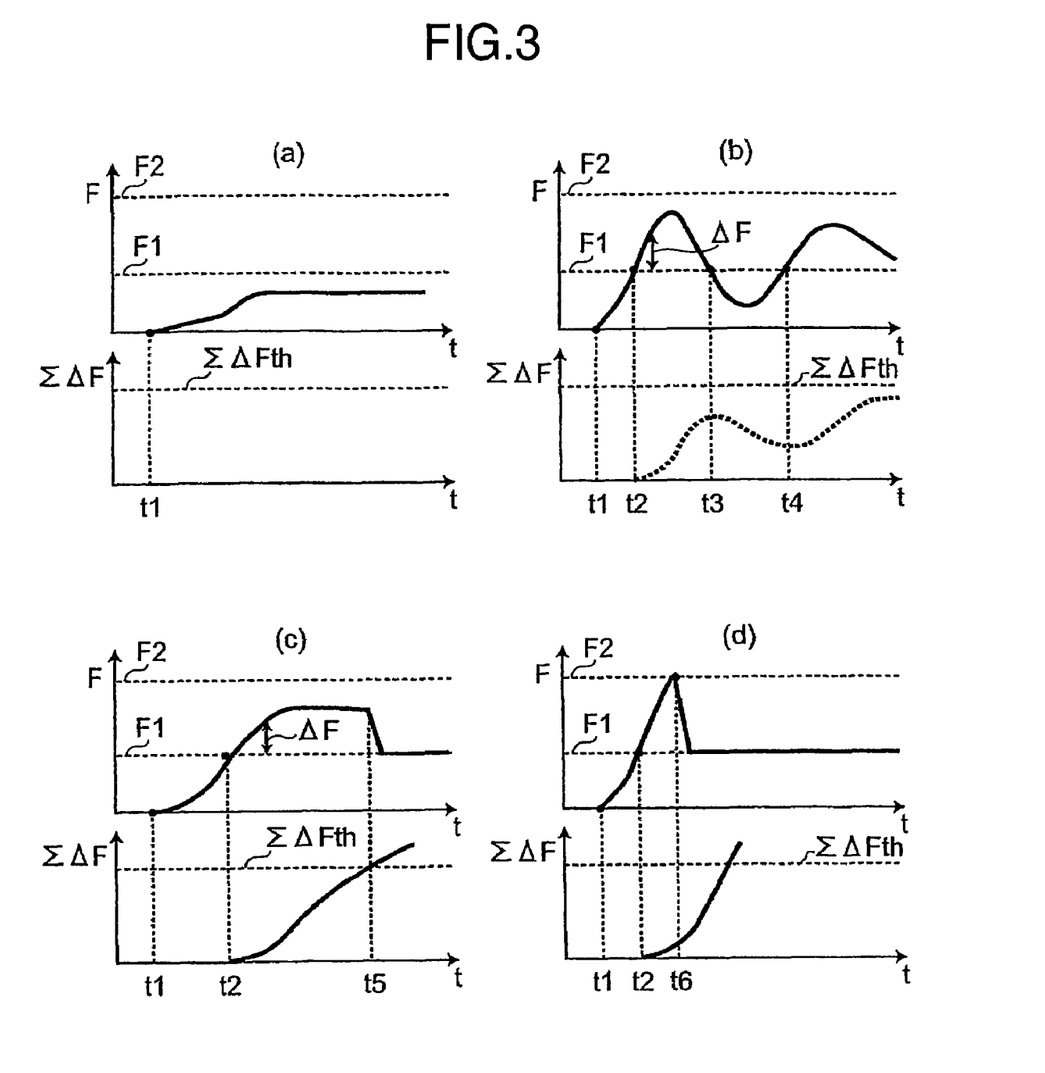
FIG. 3 is a view which shows a time response of the embodiment of the present invention.

Referring to FIGS. 2 and 3, explanation will be made of operating conditions of the motor driven actuator 5 in accordance with pedaling forces by the driver. FIG. 2 shows the electric assist force depending upon a pedaling force Fin inputted to the brake pedal 1. As to the assist force F of the electric actuator 5, there are set a rated assist force F1 which can be generated in a steady-state manner by the electric actuator 5, and a maximum assist force F2 which can be generated at maximum by the electric actuator 5. The time when the maximum assist force F2 can be generated is limited in view of a restraint due to heat generation or the like. In a condition in which an integrated value $\Sigma\Delta F$ does not exceed a predetermined value $\Sigma\Delta Fth$, an assist force greater than the rated assist force F1 but less than the maximum assist force F2 can be generated. Where $\Sigma\Delta F$ is the time integration of a high assist component $\Delta F$ which in turn is a difference between the electric assist force F and the rated assist force F1.

As in a range A shown in FIG. 2, if a pedaling force Fin with which the electric assist force F becomes not greater than the rated assist force F1 is inputted, the electric assist force F generated by the electric actuator 5 becomes proportional to the pedaling force Fin by the driver. An example of responses of the electric assist force F and the integrated value $\Sigma\Delta F$ of high assist components in this case are shown in FIG. 3(a). As will be understood, if the electric assist force F is not greater than the rated assist force F1, the integral value $\Sigma\Delta F$ of high assist components is held to be zero.

Further, at this time, the hydraulic pumps 62 of the hydraulic actuator will not be operated, and accordingly, a condition is held such that the hydraulic valves 63 are opened and the hydraulic valves 64 are opened but the hydraulic valves 65 are closed. Thus, the hydraulic pressure of the master cylinder 2 which is boosted up by the pedaling force of the driver and the electric actuator 5 is transmitted to the brake force generating mechanisms 3 by way of the hydraulic valves 63, 64.

Thus, upon weak braking of a highly-used, the assist force is generated only by the electric actuator 5, and accordingly, the assist to the pedaling force can be covered by the electric actuator 5 which is small-sized, over various operating conditions. Further, upon weak braking with which the driver can sensibly grasp pedal feeling, no vibration is generated from the hydraulic actuator 6 since only the electric actuator assist the pedaling force, it is possible to prevent deterioration of the pedal feeling. Further, the hydraulic pressure is transmitted from the master cylinder 2 to the brake force generating mechanisms 3 without passing through the hydraulic pumps 62, no passage resistance caused by the hydraulic pumps is effective, thereby it is possible to prevent the deterioration of the pedal feeling. Further, since no operation of the hydraulic actuator 6 is required during weak braking having a high use frequency, the consumption of the hydraulic actuator 5 can be restrained. Thus, it is possible to provide a highly reliable brake system which has satisfactory pedaling feeling and which is small-sized.

As in a pedaling force range B shown in FIG. 2, in such a case that a pedaling force Fin with which the electric assist force F exceeds the rated assist force F1 but is not greater than the maximum assist force F2, is inputted, if the integrated value $\Sigma\Delta F$ of high assist components is not greater than the predetermined value $\Sigma\Delta F$th, the electric assist force F produced from the electric actuator 5 becomes proportional to the pedaling force Fin by the driver. In this case, an example of responses of the electric assist force F and the integrated value $\Sigma\Delta F$ of high assist components is shown in FIG. 3(b). The integrated value $\Sigma\Delta F$ of high assist components increases during a period from a time t2 to a time t3 and subsequent to a time t4, where the electric assist force F exceeds the rated assist force F1, but the integrated value $\Sigma\Delta F$ of high assist components decreases during a period from the time t3 to the time t4 where the electric assist force F is not greater than the rated assist force F1. Through the above-mentioned serial operation, the integrated value $\Sigma\Delta F$ of high assist components does not exceed the predetermined value $\Sigma\Delta F$th, so that the electric assist force F produced by the electric actuator 5 maintains a value which is proportional to the pedaling force Fin by the driver. At this time, the hydraulic actuator 6 carries out operation similar to that of above-mentioned with reference to FIG. 3(a).

Meanwhile, on a condition of the pedaling force range B shown in FIG. 2, if the integrated value $\Sigma\Delta F$ of high assist components exceeds the predetermined value $\Sigma\Delta F$th, the electric assist force F produced by the electric actuator 5 is limited to the rated assist force F1. FIG. 3(c) shows an example of responses of the electric assist force F and the integrated value $\Sigma\Delta F$ of high assist components in this case. The integrated value $\Sigma\Delta F$ of high assist components increases subsequent to the time t2 when the electric assist force F exceeds the rated assist force F1, and at a time t5, the integrated value $\Sigma\Delta F$ of high assist components exceeds the predetermined value $\Sigma\Delta F$th.

Until the time t5, the electric actuator 5 and the hydraulic actuator 6 carry out operation similar to that shown in FIG. 3(a). Subsequent to the time t5, the hydraulic pumps 62 in the hydraulic actuator 6 are energized so as to boost up the brake fluid from the reservoir 7, and at the same time, the hydraulic valves 63 are controlled so as to be closed. Further, the hydraulic valves 64 and the hydraulic valves 65 are intermittently opened and closed so as to control the hydraulic pressure produced in the brake force generating mechanisms 3. In order to increase the hydraulic pressure of the brake force generating mechanisms 3, the hydraulic valves 64 are opened while the hydraulic valves 65 are controlled to be closed so as to feed the hydraulic pressure which has been boosted up by the hydraulic pumps 62, into the brake force generating mechanisms 3. In order to maintain the hydraulic pressure in the brake force generating mechanisms 3, the hydraulic valves 64 and the hydraulic valves 65 are controlled to be closed. In order to decrease the hydraulic pressure of the brake force generating mechanisms 3, the hydraulic valves 64 are closed, but the hydraulic valve 65 are controlled to be opened so as to return the hydraulic pressure from the brake force generating mechanism 3 to the input side of the hydraulic pumps 62.

As in a pedaling force range C shown in FIG. 2, in such a case that the pedaling force Fin with which the electric assist force F exceeds the maximum assist force F2 is inputted, the electric assist force F produced by the electric actuator 5 is limited to the rated assist force F1. FIG. 3(d) shows an example of responses of the electric assist force F1 and the integrated value $\Sigma\Delta F$ of high assist components in this case. The integrated value $\Sigma\Delta F$ of high assist components increases subsequent to the time t2, when the electric assist force F exceeds the rated assist force F1. The electric assist force F exceeds the maximum assist force F2 at a time t6 earlier than a time at which the integrated value $\Sigma\Delta F$ of high assist components exceeds the predetermine value $\Sigma\Delta F$th. Until the time t6, the electric actuator 5 and the hydraulic actuator 6 carry out operation similar to that in the pedaling force range A shown in FIG. 2, and subsequent to the time t6, they carry out operation similar to that subsequent to the time t5 in FIG. 3(c).

The hydraulic pressure during strong braking, which is difficult to be generated by the electric actuator 5 having a small-size, is generated by the hydraulic actuator 6, and accordingly, it is possible to restrain the electric actuator 5 from becoming large-sized. Further, since no vibration of hydraulic pressure caused by the operation of the hydraulic actuator 6 for holding the closing of the hydraulic valves 63 is transmitted to the brake pedal 1, it is possible to prevent deterioration of the pedal feeling. Further, since the condition with which the hydraulic actuator 6 is operated is limited by a reference value using a time as a variable, the reference value is so-called integrated value $\Sigma\Delta F$ of high assist components, even in a range where the electric assist force F exceeds the rated assist force F1, it is possible to restrain consumption of the hydraulic actuator 6, and it is also possible to prevent deterioration of the pedal feeling. Thereby it is possible to provide a brake system having satisfactory pedal feeling, which is small-sized and which is highly reliable.

Further, the hydraulic actuator 6 can individually control brake forces at the respective wheels in accordance with, for example, vehicle operating conditions such as a pedaling force value of the brake pedal 1, a wheel speed, a vehicle speed, an acceleration of the vehicle, a steering angle of a steering unit, a turning angular velocity of the vehicle, and a degree of depression of an accelerator pedal by the driver, and environments external of the vehicle, such as a distance between the preceding vehicle and the instant vehicle, a relative speed therebetween, a presence of an obstacle and a road slope. In order to independently increase the brake force at every wheel, the hydraulic pumps 62f, 62r are driven, and at the same time the hydraulic valve 64 for a wheel at which increasing of the brake force is desired, is controlled to be opened while the hydraulic valve 64 for a wheel at which increasing of the brake force is not required, is controlled to be closed. In order to independently decrease the brake force at every wheel, the hydraulic valve 65 for a wheel at which decreasing of the brake force is desired, is controlled to be opened but the hydraulic valve 65 for a wheel at which decreasing of the brake force is not required, is controlled to be closed.

Thus, by arranging the hydraulic actuator 6 capable of independently controlling the wheels, between the master cylinder 2 and the brake force generating mechanisms 3, the function of the electric actuator 5 may be limited to the pressurization of the maser cylinder 2, while the control of the wheels, can be made independently from one another by the hydraulic pressure distributing function obtained by the hydraulic valves in the hydraulic actuator 6, thereby it is possible to materialize a small-sized electric actuator. Thus, it is possible to provide a brake system capable of assisting a pedaling force of the driver by a small-sized electric actuator, and of individually controlling brake forces at a plurality of wheels.

Further, if the electric actuator 5 or the electric actuator controller 15 fails, the hydraulic actuator controller 16 detects a failure signal or an interruption of signal transmission from the electric actuator controller 16 in order to grasp a failure of the electric actuator 5 or the electric actuator controller 15. At this time, the hydraulic actuator controller 16 calculates a brake force which should be applied to the wheels, from a signal delivered from the pedaling force sensor 11, and drives the hydraulic actuator 6. On the contrary, if the hydraulic actuator 6 or the hydraulic actuator controller 16 fails, the electric actuator controller 15 detects a failure signal or an interruption of signal transmission from the hydraulic actuator controller 16 so as to grasp a failure of the hydraulic actuator 6 or the hydraulic actuator controller 16. At this time, the hydraulic valves 63, 65 are reset to an open condition while the hydraulic valves 65 are reset to a closed condition, and the electric actuator controller 16 carries out assist operation in accordance with a signal from the pedaling force sensor 1. Thus, since the brake system includes two actuators, even one of the actuator fails, a sufficient brake force can be produced by the other actuator. Thereby it is possible to provide a highly reliable brake system.

Further, if the first electric accumulator 17 is depleted or fails so as to cause a power failure, the electric actuator controller 15 and the hydraulic actuator controller 16 are fed thereto with an electric power from the second electric accumulator 18 so as to drive their actuators. In turn, if the second electric accumulator 18 is depleted or fails so as to cause a power failure, the electric actuator controller 15 and the hydraulic actuator controller 16 are fed thereto with an electric power from the first electric accumulator 17 so as to drive their respective actuators. Thus, since the two electric accumulators are incorporated in the brake system, even though one of the electric accumulators is depleted or fails, an assist force equivalent to that usually obtained can be produced by the other electric accumulator, thereby it is possible to provide a highly reliable brake system.

Although, in the above-mentioned embodiment, the electric actuator 5 and the hydraulic actuator 6 are changed over in a similar condition with respect to whole wheels, the brake force generating mechanisms 3fl, 3fr may be always driven by the hydraulic actuator as to the front wheels. In this case, the hydraulic pumps 62f, 63r are provided thereto with respective exclusive electric motors 61a, 61f (which are not shown), and accordingly, the hydraulic pumps 62f, 63r can be independently controlled. As to the front wheels, the hydraulic valves 63 are held in a closed condition, irrespective of the degree of the pedaling force, the hydraulic pump 62f, the hydraulic valves 64 and the hydraulic valves 65 are energized always so as to control the hydraulic pressures produced in the brake force generating mechanisms 3fl, 3fr if the brake forces are required at the front wheels. On the contrary, as to the rear wheels, the operation is changed over between the electric actuator 5 and the hydraulic actuator 6 in accordance with a degree of the pedaling force, as stated in the above-mentioned embodiment.

As above-mentioned, by producing the brake forces for the front wheels always with the hydraulic actuator 6, the electric actuator 5 may merely have a capability of producing an assist force only for the rear wheels. Thus, a drive torque required for the electric actuator 5 can be reduced. Further, since the brake forces for the front wheels can be controlled, irrespective of the operating force by the driver, smooth coordinate control can be made with respect to a regenerative brake force in such a vehicle that a generator for regenerating a brake energy is provided at the front wheels. Furthermore, since the rear wheels are connected by the hydraulic pipe line, moderate damping feeling can be effected in the operation of the brake pedal with the use of a fluid resistance of the brake fluid flowing through the hydraulic pipe lines, so that it is possible to exhibit comfortable pedal feeling. Thereby it is possible to provide a small-sized brake system having satisfactory pedal feeling.

It is noted here that the brake forces at the rear wheels may be always generated by the hydraulic actuator 6 although it has been explained that the brake forces at the front wheels are always generated by the hydraulic actuator 6. Since the brake forces and the responsiveness which are required for the rear wheels are small in comparison with those for the front wheels, the drive capability and the operation frequency which are required for the hydraulic actuator 6 can be restrained. Thus, it is possible to provide a brake system incorporating the hydraulic actuator 6 which is highly reliable. Further, regenerative coordinate braking can be achieved in a vehicle in which a generator for regenerating a brake energy is provided at the rear wheels.

Figure 4:
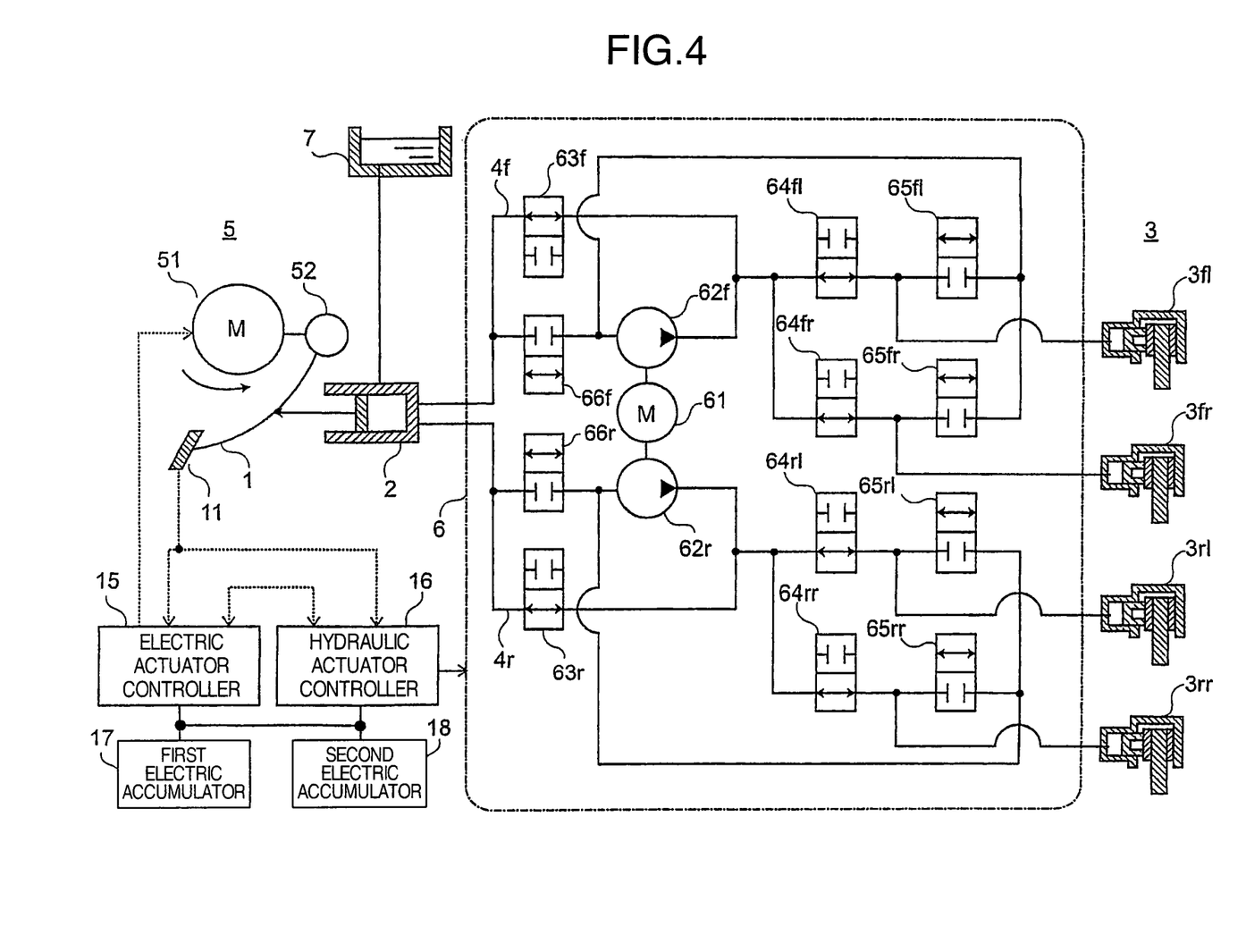
FIG. 4 is a view illustrating another embodiment of the present invention.

FIG. 4 shows a second embodiment of the present invention. It is noted that explanation of components having like functions to those of components in the first embodiments will be omitted.

A brake system in the second embodiment has the same configuration as that of the first embodiment, except that the pipe line arrangement for feeding brake fluid into the hydraulic pumps 62 are different from that in the first embodiment. The brake fluid is fed into the hydraulic pumps 62 from the master cylinder 2, instead from the reservoir 7 as in the first embodiment. That is, the input side of the hydraulic pumps 62 is connected to the pipe lines 4f, 4r which connect the master cylinder 2 to the hydraulic valves 63, and the hydraulic valves 66 are provided in the connection pipe lines. The pipe lines from the hydraulic valves 65 are connected between the hydraulic valves 66 and the hydraulic pump 62.

In order to assist the pedaling force only by the electric actuator 5, the hydraulic valves 63 are opened while the hydraulic valves 66 are closed so that the liquid pressure is transmitted from the master cylinder 2 to the brake generating mechanisms 3 by way of the passages bypassing the hydraulic pumps 62. Thus, the brake fluid can smoothly flow with no resistance by the hydraulic pumps 62, and accordingly, it is possible to prevent deterioration of the pedal feeling. Further, in order to produce the brake force by the hydraulic actuator 6, the hydraulic valves 63 and the hydraulic valves 66 are closed, and the hydraulic pump 62f, the hydraulic valves 64 and the hydraulic valve 65 are energized so as to control the hydraulic pressure which is produced in the brake force generating mechanisms 3*fl*, 3*fr*. Accordingly, no vibration of hydraulic pressure caused by the energization of the hydraulic actuator is transmitted to the brake pedal 1, thereby it is possible to prevent deterioration of the pedal feeling. Further, if a stronger brake force is required, the hydraulic valves 63 are closed while the hydraulic valves 66 are opened so as to boost up the hydraulic pressure pressurized by the master cylinder 2 with the hydraulic pump 62, thus, a stronger brake force can be produced by the brake force generating mechanisms 3. Further, since no pipe line from the reservoir 7 to the hydraulic actuator 6 is present, it is possible to provide a small-sized brake system incorporating a convenient pipe line.

Figure 5:
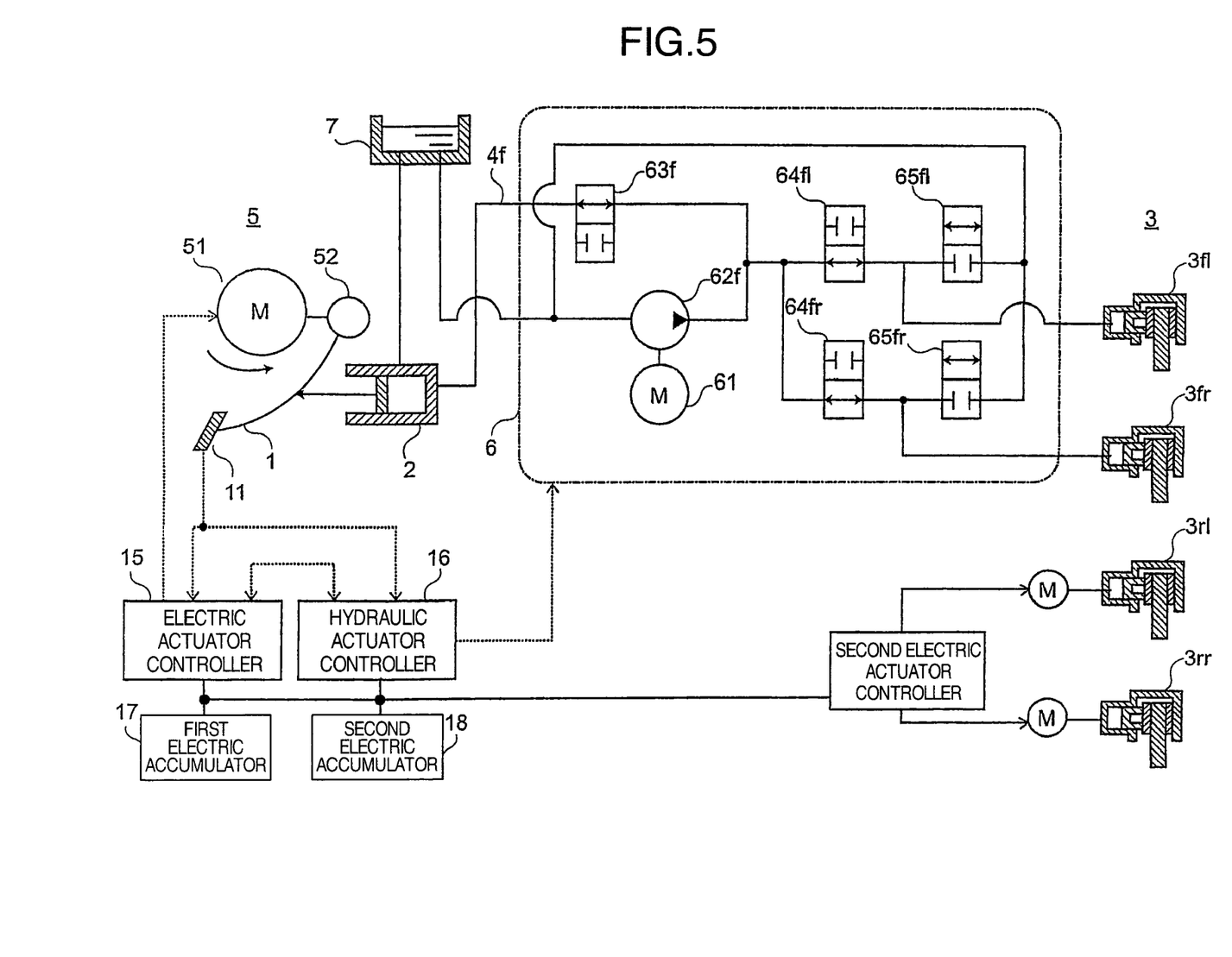
FIG. 5 is a view illustrating further another embodiment of the present invention.

FIG. 5 shows a third embodiment of the present invention. It is noted that explanation of components having functions similar to those in the first and second embodiments, and explanation of the operations thereof will be omitted.

In a brake system in the third embodiment, the brake unit for the front wheels have a configuration similar to that in the first embodiment, except that as to the rear wheels, there are provided vehicle electric actuators 31*rl*, 31*rr* which are incorporated as the brake force generating mechanisms 3*rl*, 3*rr* for the respective wheels. Each of the wheel electric actuators 31 is composed of an electric motor 32 for generating a drive torque from an electric energy, and a rotation/linear motion converting mechanism 33 for converting a rotational drive torque into a rectilinear pressing force, and is driven by a wheel electric actuator controller 19. As to the front wheels, similar to the first embodiment, the operations of the electric actuators 5 and the hydraulic actuator are changed over. As to the rear wheels, the vehicle electric actuators 31 are driven so as to control the brake forces generated at the respective wheels.

Thus, by producing the brake forces for the rear wheels always with the wheel electric actuators 31, the drive torque required for the electric actuators 5 can be reduced. Further, since the brake force can be controlled, irrespective of an operating force by the driver, it is possible to carry out smooth control in coordination with a regenerative brake force in a vehicle in which a generator for regenerating a brake energy is provided at the rear wheels. Further, since the front wheels are connected by hydraulic pipe lines, moderate damping feeling can be applied to the operation of the brake pedal by the driver, and accordingly comfortable feeling can be exhibited. Since the vehicle electric actuators 31*rl*,31*rr* can control brake forces, independent from each other, the brake forces for the respective wheels of the vehicle can be controlled, independent from one another, similar to the first embodiment. Thus, it is possible to provide a brake system having satisfactory pedal feeling, capable of assisting a pedaling force of the driver by a small-sized electric actuator, and capable of individually controlling brake forces for a plurality of wheels.

In the above-mentioned third embodiment, the electric actuator 5 and the hydraulic actuator 6 are arranged for the front wheels while the vehicle electric actuators 31 are arranged for the rear wheels. However, there may be arranged the vehicle electric actuators 31 for the front wheels and the electric actuator 5 and the hydraulic actuators 6 for the rear wheels. Since the brake forces for the rear wheels are small in comparison with those for the front wheels, it is possible to a brake system incorporating a smaller electric actuator 5.

The invention claimed is:

1. A control apparatus for a brake system comprising an actuator control unit detecting a displacement of a brake pedal which displaces in accordance with an operating force of a driver for controlling an actuator, and the actuator controlled by the actuator control unit for producing a brake force applied to a brake force generating mechanism, characterized in that the actuator control unit is composed of an electric actuator controller and a hydraulic actuator controller, the actuator is composed of a first actuator and a second actuator composed of a hydraulic pump and a hydraulic valve means, controlled by the hydraulic actuator controller, the first actuator is arranged in a hydraulic pipe line connected to the brake force generating mechanism, and composed of a hydraulic pressure supply means which is operated by an electric drive source controlled by the electric actuator controller, and the hydraulic valve means, the hydraulic pressure supply means is connected to the hydraulic pipe line in parallel with the hydraulic pump for feeding a hydraulic pressure to the brake force generating mechanism by way of the hydraulic valve means, and the hydraulic pump is connected to the hydraulic pipe in parallel with the hydraulic supply means so as to feed a hydraulic pressure into the brake force generating mechanism, such that the hydraulic pressure is supplied to the brake force generating mechanism through one of the hydraulic pressure supply means and the hydraulic pump depending on a degree of displacement of the brake pedal, wherein the hydraulic valve means opens to supply the hydraulic pressure to the brake force generating mechanism while the hydraulic pump stops when the hydraulic pressure is supplied to the brake force generating mechanism through the hydraulic pressure supply means, and the hydraulic pump is driven to supply the hydraulic pressure to the brake force generating mechanism while the hydraulic valve means closes when the hydraulic pressure is supplied to the brake force generating mechanism through the hydraulic pressure supply means.

2. A control apparatus for a brake system as set fort in claim 1, characterized in that the hydraulic valve means is composed of at least two hydraulic valves adapted to be opened and closed under electronic control.

3. A control apparatus for a brake system as set forth in claim 1, characterized in that the electric actuator control unit and the hydraulic actuator control unit are operated being changed over in accordance with a degree of displacement of the brake pedal, or a time when a change of the brake pedal exceeds a predetermined value.

4. A control apparatus for a brake system as set forth in claim 1, characterized in that the first brake actuator drives the brake force generating mechanism for at least one of a plurality of wheels incorporated in a vehicle, and a second brake actuator drives the brake force generating mechanism different from the first brake actuator.

5. A control apparatus for a brake system as set forth in clam 1, characterized by further comprising an electric accumulator for feeding electric powers to the first brake actuator, and an electric accumulator for feeding electric power to the second brake actuator.

6. A control apparatus for a brake system comprising an actuator control unit detecting a displacement of a brake pedal which displaces in accordance with an operating force of the driver, for controlling an actuator, and the actuator controlled by the actuator control unit, for producing a brake force applied to a brake force generating mechanism, characterized in that the actuator control unit is composed of an electric actuator controller and a hydraulic actuator controller, the electric actuator controller delivers an electric assist force signal in accordance with a change of the brake pedal, carries out time integration when the electric assist force signal exceeds a first rated electric assist force signal value, so as to calculate an integrated value, and sets the electrical assist force signal value to a first rated electric assist force signal value when the integrated value exceeds a predetermined value, or sets the electric assist force signal value, at once, to the first rated electric assist force signal value when the electric assist force signal reaches a second rated electric assist force signal value, and the hydraulic actuator controller produces a hydraulic assist force signal in accordance with a change of the brake pedal when the electric actuator controller delivers an electric assist force signal set to the first rated electric assist force signal value.

7. A control apparatus for a brake system as set forth in claim 6, characterized in that the actuator control unit interrupts the control of the actuator depending upon the electric actuator force signal when the electric actuator controller delivers the first rated electric assist force signal, and controls the actuator in accordance with a hydraulic actuator signal delivered from the hydraulic actuator controller.

8. A control apparatus for a brake system as set forth in claim 6, characterized in that the first brake actuator drives the brake force generating mechanism for at least one of a plurality of wheels incorporated in a vehicle, and a second brake actuator drives the brake force generating mechanism different from the first brake actuator.

9. A control apparatus for a brake system as set forth in claim 6, characterized by an electric accumulator for feeding electric power to the first brake actuator, and an electric accumulator for feeding electric power to the second brake actuator.

10. A brake system comprising a brake pedal which displaces in accordance with an operating force of the driver, an actuator control unit detecting a displacement of the brake pedal for controlling an actuator, and the actuator controlled by the actuator control unit for producing a brake force applied to a brake force generating mechanism, characterized in that the actuator control unit is composed of an electric actuator controller and a hydraulic actuator controller, the actuator is composed of a first actuator and a second actuator composed of a hydraulic pump and a hydraulic valve means, controlled by the hydraulic actuator controller, the first actuator is arranged in a hydraulic pipe line connected to the brake force generating mechanism and composed of a hydraulic pressure supply means which is operated by an electric drive source controlled by the electric actuator controller, and the hydraulic valve means, the hydraulic pressure supply means is connected to the hydraulic pipe line in parallel with the hydraulic pump so as to feed a hydraulic pressure to the brake force generating mechanism by way of the hydraulic valve, and the hydraulic pump is connected to the hydraulic pipe line in parallel with the hydraulic pressure supply means so as to feed a hydraulic pressure to the brake force generating mechanism by way of the hydraulic valve means, the hydraulic valve means is operated so as to feed a hydraulic pressure to the brake force generating mechanism from either one of the hydraulic pressure supply means and the hydraulic pump, the electric actuator controller delivers an electric assist force signal in accordance with a change of the brake pedal, carries out time integration so as to calculate an integrated value when the electric assist force signal exceeds a first rated electric assist force signal value, and sets the electric assist force signal value to the first rated electric assist signal value when the integrated value exceeds a predetermined value, or sets the electric assist force signal value, at once, to the first rated assist force signal value when the electric assist force signal reaches a second rated electric assist force signal value, the hydraulic actuator controller delivers a hydraulic assist force signal in accordance with a change of the brake pedal when the electric actuator controller delivers an electric assist force signal set to the first rated assist force signal value, and the actuator control unit interrupts the control of the first actuator depending upon the electric assist force signal when the electric actuator controller delivers the first rated electric assist signal, and controls the second actuator in accordance with a hydraulic actuator signal delivered from the hydraulic actuator controller.

\* \* \* \* \*